(12) United States Patent
Wang

(10) Patent No.: US 7,356,252 B2
(45) Date of Patent: Apr. 8, 2008

(54) AUTO-FOCUSING ZOOM LENS MECHANISM

(75) Inventor: Hui-Man Wang, Hsinchu (TW)

(73) Assignee: Foxlink Image Technology Co., Ltd., Hsinchu (TW)

( * ) Notice: Subject to any disclaimer, the term of this patent is extended or adjusted under 35 U.S.C. 154(b) by 343 days.

(21) Appl. No.: 11/284,251

(22) Filed: Nov. 19, 2005

(65) Prior Publication Data
US 2007/0116446 A1 May 24, 2007

(51) Int. Cl.
G03B 17/00 (2006.01)
G03B 3/10 (2006.01)
G02B 15/14 (2006.01)
G02B 7/02 (2006.01)
H04N 5/262 (2006.01)
H04N 5/232 (2006.01)
H04N 5/225 (2006.01)

(52) U.S. Cl. .................... 396/79; 396/83; 396/132; 396/133; 359/694; 359/696; 359/699; 359/700; 359/823; 348/240.99; 348/345; 348/373; 348/374; 348/375

(58) Field of Classification Search ............ 396/77, 396/79, 83, 86, 132, 133, 529, 84, 378, 379; 359/693, 694, 696, 698, 699, 700, 822, 823; 348/211.9, 240.99, 345, 373, 374, 375
See application file for complete search history.

(56) References Cited

U.S. PATENT DOCUMENTS

| 4,583,827 | A | * | 4/1986 | Tokunaga et al. | 359/696 |
| 4,763,999 | A | * | 8/1988 | Lawther | 359/699 |
| 4,944,030 | A | * | 7/1990 | Haraguchi et al. | 396/62 |
| 5,140,468 | A | * | 8/1992 | Kayanuma | 359/699 |
| 5,321,462 | A | * | 6/1994 | Haraguchi et al. | 396/85 |
| 5,864,719 | A | * | 1/1999 | Hirohata | 396/82 |
| 5,886,830 | A | * | 3/1999 | Oono et al. | 359/696 |

* cited by examiner

Primary Examiner—Benny Q. Tieu
Assistant Examiner—Michael A Strieb

(57) ABSTRACT

An auto-focusing zoom lens mechanism includes a base unit forming a space; an auto-focusing (AF) lens unit located in the base unit and having a trajectory bar engaged therewith; a zoom lens unit located in the base unit and mounted on the AF lens unit and having a trajectory bar engaged therewith; a cam plate unit engaged with the AF lens unit and the zoom lens unit and provided with an AF trajectory groove and a zoom trajectory groove to receive the trajectory bars of the AF lens unit and the zoom lens unit; and a step motor unit engaged with the cam plate unit to drive the cam plate unit, the AF lens unit and the zoom lens unit moving.

5 Claims, 4 Drawing Sheets

AUTO-FOCUSING ZOOM LENS MECHANISM

BACKGROUND OF THE INVENTION

1. Field of the Invention

The present invention relates to an auto-focusing (AF) zoom lens mechanism, and in particular to an auto-focusing zoom lens mechanism having one step motor unit driving a zoom lens unit and an AF lens unit.

2. The Related Art

In general, a conventional auto-focusing (AF) zoom lens mechanism has two step motors. One of the step motors drives a zoom lens unit to achieve the function of zoom, and the other drives an AF lens unit to achieve the function of AF.

The auto-focusing zoom lens mechanism has to provide at least two step motors. The structure of the auto-focusing zoom lens mechanism is very complex, so that it is very difficult to assemble and it is not convenient to use. Furthermore, The auto-focusing zoom lens mechanism utilizes two step motors to drive the zoom lens unit and the AF lens unit, respectively. It is difficult to operate these step motors synchronously. Therefore, the operation of the auto-focusing zoom lens mechanism is not precise and hard to take a clear image.

SUMMARY OF THE INVENTION

An object of the present invention is to provide an auto-focusing zoom lens mechanism. The auto-focusing zoom lens mechanism comprises a base unit, an auto-focusing (AF) lens unit and a zoom lens unit located in the base unit. Each of the AF lens unit and the zoom lens unit has a trajectory bar. A cam plate unit provides with an AF trajectory groove and a zoom trajectory groove to receive the trajectory bars of the AF lens unit and the zoom lens unit. A step motor unit engages with the cam plate unit to drive the cam plate unit, the AF lens unit and the zoom lens unit moving. Therefore, the auto-focusing zoom lens mechanism utilizes a step motor to drive the AF lens unit and the zoom lens unit synchronous.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE PREFERRED EMBODIMENT

Detailed description will hereunder be given of the preferred embodiment of an auto-focusing zoom lens mechanism according to the present invention with reference to the accompanying drawings.

Figure 1:
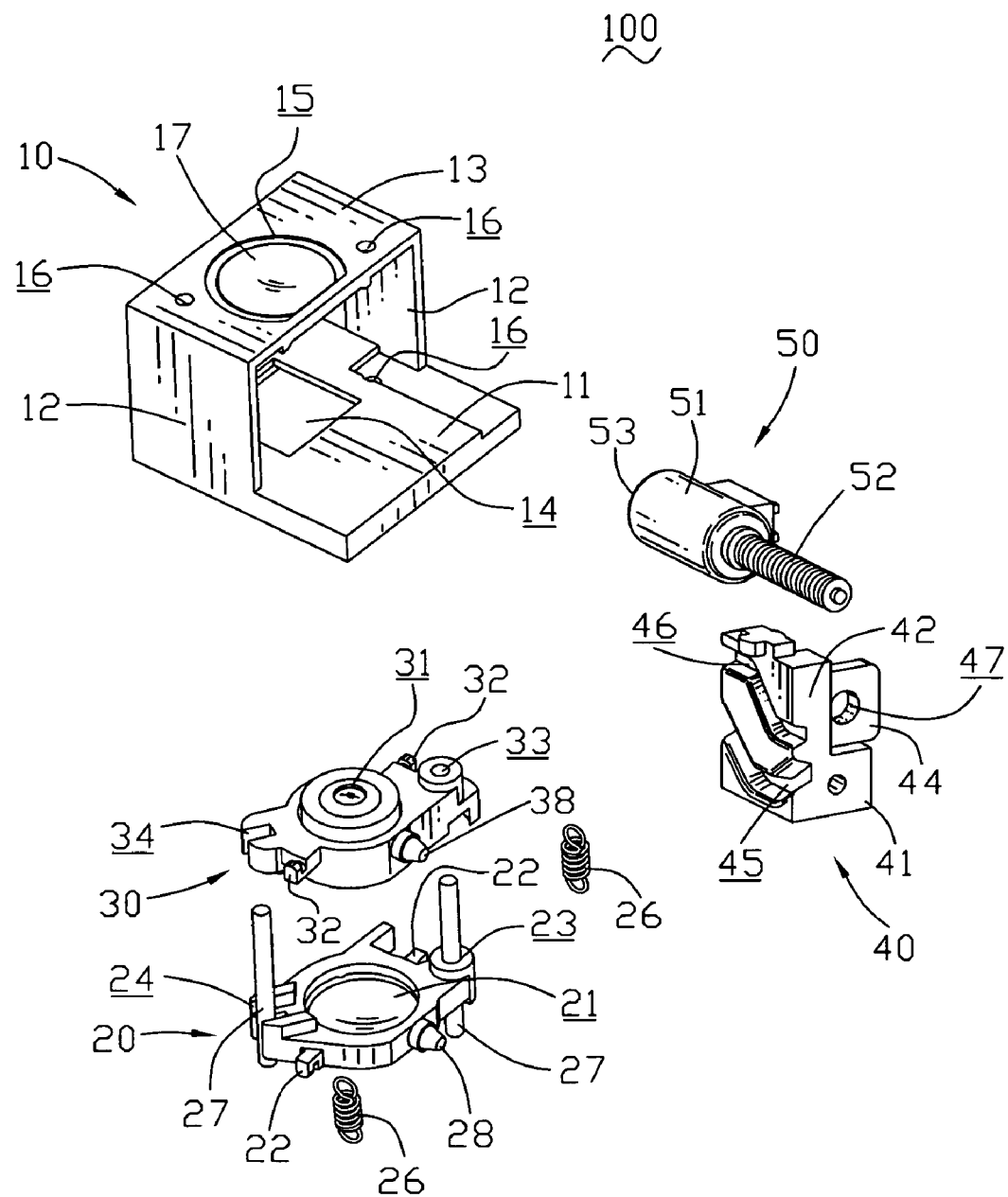
FIG. 1 is a perspective view of an auto-focusing zoom lens mechanism according to the invention.
Figure 2:
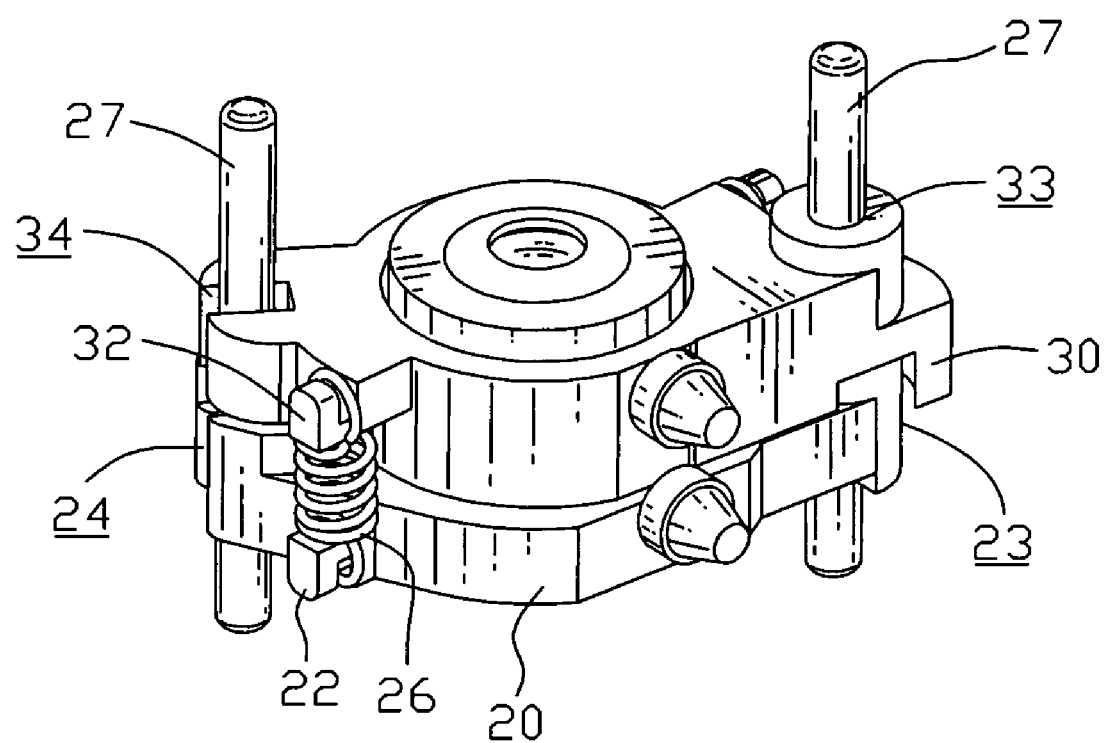
FIG. 2 is a perspective view of an assembled zoom lens unit and AF lens unit according to the invention.

Please refer to FIG. 1 and FIG. 2. An auto-focusing zoom lens mechanism 100 according to the present invention includes a base unit 10, an auto-focusing (AF) lens unit 20 which is located in the base unit 10, a zoom lens unit 30 which is located in the base unit 10 and mounted on the AF lens unit 20, a cam plate unit 40 which is engaged with the AF lens unit 20 and the zoom lens unit 30, a step motor unit 50 which is engaged with the cam plat unit 40.

The base unit 10 comprises a bottom plate 11, two side plates 12 vertically extending from sides of the bottom plate 11 and a top plate 13 formed on the top ends of the side plates 12. The bottom plate 11, the side plates 12 and the top plate 13 are assembled to form a space 14. A circled hole 15 is formed in the middle of the top plate 13 to receive a lens 17. There are two small holes 16 formed on the top plate 13.

There is a through hole 21 formed in the center of the AF lens unit 20 to receive a group of AF lenses. Two blocks 22 are provided in the AF lens unit 20. The two blocks 22 are symmetric with the center axis of the AF lens unit 20. A guide hole 23 forms near to one of the blocks 22. A guide groove 24 forms near to the other block 22. Each of the guide hole 23 and the guide groove 24 receives a guide shaft 27, respectively. A jointed post 25 (as show in FIG. 3) is formed at the side of the AF lens unit 20. The jointed post 25 is engaged with a trajectory bar 28.

The structure of the zoom lens unit 30 is similar to the structure of the AF lens unit 20. There is a through hole 31 formed in the center of the zoom lens unit 30. The through hole 31 is arranged to receive a group of zoom lenses. Two blocks 32 are provided in the zoom lens unit 30. Two springs 26 are provided. Each spring 26 is engaged with the block 22 and the block 32. The two blocks 32 are symmetric with the center axis of the zoom lens unit 30. A guide hole 33 forms near to one of the blocks 32. A guide groove 34 forms near to the other block 32. Each of the guide hole 33 and the guide groove 34 receives the guide shaft 27, respectively. A jointed post 35 as show in FIG. 3) is formed at the side of the zoom lens unit 30. The jointed post 35 is engaged with a trajectory bar 38.

The cam plate unit 40 includes a supporting plate 41 in the bottom portion thereof and an up-formed plate 42 upwardly extended from the supporting plate 41. A clip plate 44 engages with one side of the up-formed plate 42 and has a central hole 47 to engage with the step motor unit 50. There is an AF trajectory groove 45 and a zoom trajectory groove 46 formed on the other side of the up-formed plate 42 and receiving the trajectory bars 28, 38, respectively.

The step motor unit 50 comprises a cover 51, a screw 52 and a step motor 53. The screw 52 extends from one end of the step motor 53 which is covered by the cover 51. The screw 52 of the step motor unit 50 inserts into the central hole 47 of the clip plate 44, so that the step motor unit 50 rotates to drive the cam plate unit 40 moving.

Figure 3:
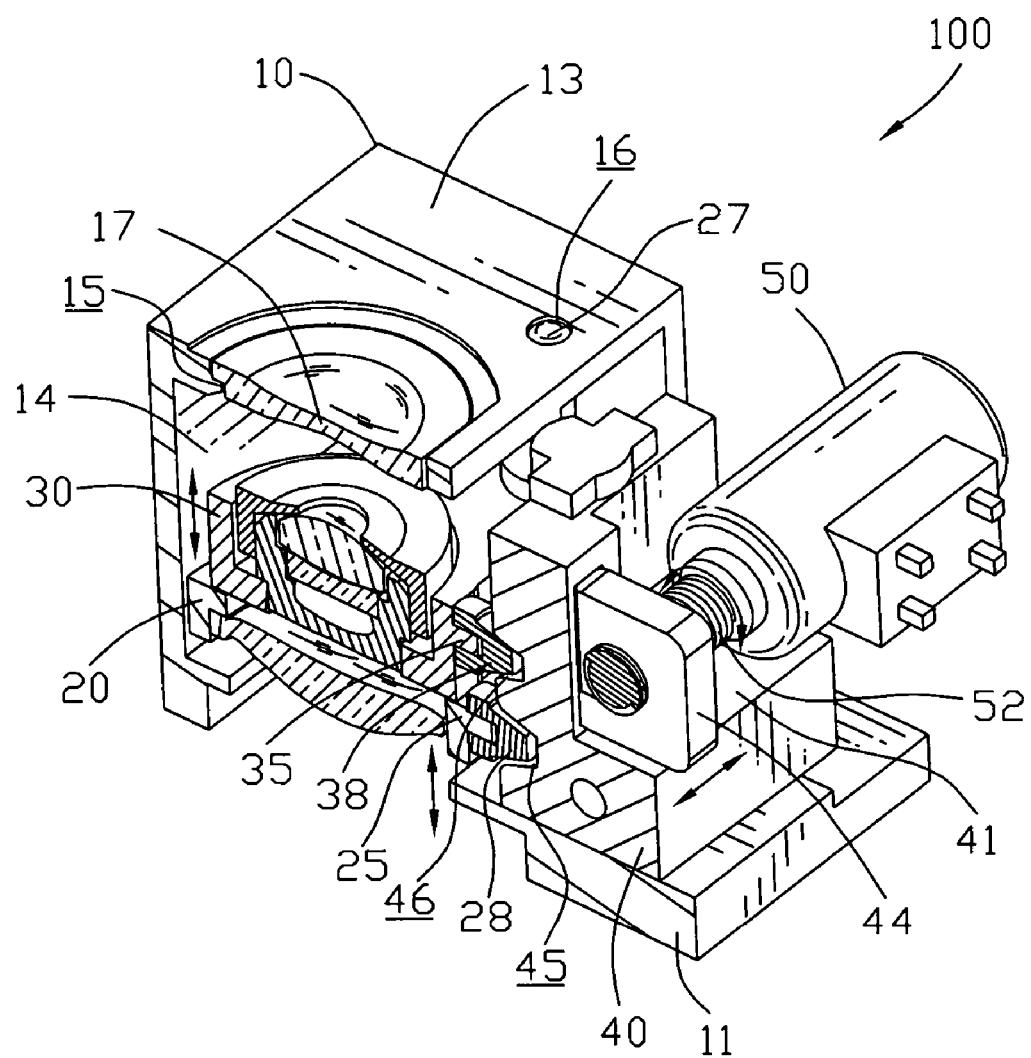
FIG. 3 is a cross-sectional view of the structure of the auto-focusing zoom lens mechanism.

As show in FIG. 3, the AF lens unit 20 and the zoom lens unit 30 are fixed together and received in the space 14 of the base 10. The top portions of the two guide shafts 27 get through the two small holes 16 of the top plate 13 of the base 10, respectively. Thus, the AF lens unit 20 and the zoom lens unit 30 move up and down along the two guide shafts 27. The supporting plate 41 of the cam plate unit 40 is seated on the end of the bottom plate 11 of the base unit 10. The trajectory bar 28 moves in the AF trajectory groove 45 and the trajectory bar 38 moves in the zoom trajectory groove 46. The lens 17 is inserted into the circled hole 15 of the base 10.

When the step motor unit 50 operates, the screw 52 of the step motor unit 50 rotates and, at the same time, the cam plate unit 40 moves forth and back in the horizontal direction. Because of the moving of the cam plate unit 40, the trajectory bars 28, 38 move in the AF trajectory groove 45 and the zoom trajectory groove 46, respectively. Then, the AF lens unit 20 and the zoom lens unit 30 move up and down along the guide shaft 27.

Figure 4:
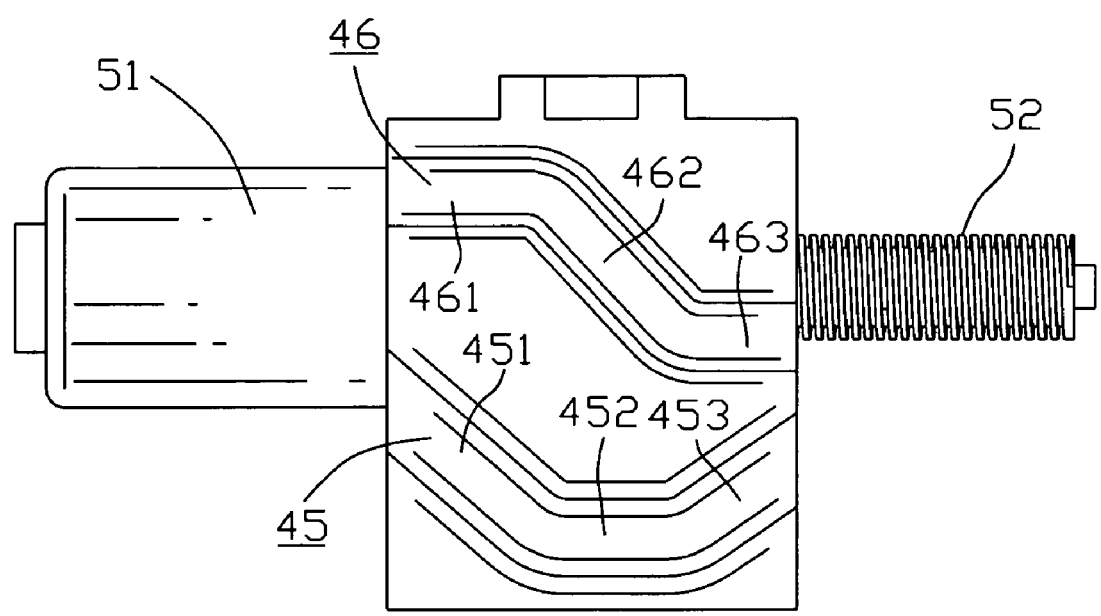
FIG. 4 is an enlarged plan view showing an AF trajectory groove and a zoom trajectory groove of a cam plat unit of the auto-focusing zoom lens mechanism.

Referring to FIG. 4, the zoom trajectory groove 46 includes a first groove section 461, a second groove section 462 extending from the first groove section 461 and a third groove section 463 extending from the second groove section 462. The AF trajectory groove 45 includes a first groove section 451, a second groove section 452 extending from the first groove section 451 and a third groove section 453 extending from the second groove section 452. The first groove section 461 horizontally extends, the second groove section 462 inclinedly extends and the third groove section 463 horizontally extends. The first groove section 451 inclinedly extends, the second groove section 452 horizontally extends and the third groove section 453 inclinedly extends. When the zoom lens unit 30 is operated at a first position, the auto-focusing zoom lens mechanism 100 has a first focal distance. At this time, the trajectory bar 38 moves in the first groove section 461 and the trajectory bar 28 moves in the first groove section 451. The AF lens unit 20 moves up and down along the guide shaft 27 because of the moving of the trajectory bar 28. So that the auto-focusing zoom lens mechanism 100 achieves the function of AF.

Then, the trajectory bar 38 moves from the end of the first groove section 461 through the second groove section 462 to the third groove section 463. At the same time, the trajectory bar 28 moves from the end of the first groove section 451 through the second groove section 452 to the third groove section 453. At this moment, the auto-focusing zoom lens mechanism 100 has a second local distance. And then, the trajectory bar 38 moves in the third groove section 463, and the trajectory bar 28 moves in the third groove section 453. The AF lens unit 20 moves up and down along the guide shaft 27 because of the moving of the trajectory bar 28. So that the auto-focusing zoom lens mechanism 100 achieve the function of AF.

The auto-focusing zoom lens mechanism 100 achieves the function of AF either at the first focal distance or at the second focal distance in order to obtain a very clear image. The clear image is obtained due to the position of the zoom lens unit 30 and the AF lens unit 20 precisely adjusted by the trajectory bars 38, 28 moving in the zoom trajectory groove 46 and the AF trajectory groove 45.

As has been described hereinabove, the auto-focusing zoom lens mechanism according to the present invention achieve the function of zoom and AF by only one step motor, so that the auto-focusing zoom lens mechanism is easily assembled and obtains a very clear image easily.

It should be understood, however, that there is no intention to limit the invention to the specific forms disclosed, but on the contrary, the invention covers all modifications, alternate constructions and equivalents falling within the spirit and scope of the invention as expressed in the appended claims.

What is claimed is:

1. An auto-focusing zoom lens mechanism comprising:
    a base unit forming a space;
    an auto-focusing (AF) lens unit located in the base unit, the AF lens unit having a trajectory bar engaged therewith;
    a zoom lens unit located in the base unit and mounted on the AF lens unit, the zoom lens unit having a trajectory bar engaged therewith;
    a cam plate unit engaged with the AF lens unit and the zoom lens unit, the cam plate unit including a supporting plate in the bottom portion thereof, an up-formed plate extended from the supporting plate and a clip plate engaged with one side of the up-formed plate, an AF trajectory groove and a zoom trajectory groove formed on the other side of the up-formed plate, the AF trajectory groove receiving the trajectory bar of the AF lens unit and the zoom trajectory groove receiving the trajectory bar of the zoom lens unit respectively, the clip plate having a central hole; and
    a step motor unit engaged with the central hole of the clip plate to drive the cam plate unit moving.

2. The auto-focusing zoom lens mechanism as claimed in claim 1, wherein the zoom trajectory groove includes a first groove section, a second groove section extending from the first groove section and a third groove section extending from the second groove section.

3. The auto-focusing zoom lens mechanism as claimed in claim 1, wherein the AF trajectory groove includes a first groove section, a second groove section extending from the first groove section and a third groove section extending from the second groove section.

4. The auto-focusing zoom lens mechanism as claimed in claim 2, wherein the first groove section horizontally extends, the second groove section inclinedly extends and the third groove section horizontally extends.

5. The auto-focusing zoom lens mechanism as claimed in claim 3, wherein the first groove section inclinedly extends, the second groove section horizontally extends and the third groove section inclinedly extends.

* * * * *